(12) United States Patent
Shibata (10) Patent No.: US 11,904,691 B2
(45) Date of Patent: Feb. 20, 2024

(54) DISPLAY APPARATUS FOR SWITCHING BETWEEN DIFFERENT DISPLAYS OF DIFFERENT IMAGES IDENTIFYING A SAME ELEMENT

(71) Applicant: Panasonic Intellectual Property Management Co., Ltd., Osaka (JP)

(72) Inventor: Tadashi Shibata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 225 days.

(21) Appl. No.: 17/525,348

(22) Filed: Nov. 12, 2021

(65) Prior Publication Data

US 2022/0072958 A1 Mar. 10, 2022

Related U.S. Application Data

(63) Continuation of application No. PCT/JP2020/009595, filed on Mar. 6, 2020.

(30) Foreign Application Priority Data

May 14, 2019 (JP) .................................. 2019-091361

(51) Int. Cl.
*G09G 3/00* (2006.01)
*B60K 37/02* (2006.01)
(52) U.S. Cl.
CPC ........ *B60K 37/02* (2013.01); *B60K 2370/177* (2019.05)
(58) Field of Classification Search
CPC .............. B60K 37/02; B60K 2370/177; B60K 2370/1529; B60K 2370/178;

(Continued)

(56) References Cited

U.S. PATENT DOCUMENTS

2016/0147073 A1 5/2016 Onda et al.
2016/0216521 A1* 7/2016 Yachida .................... B60R 1/00
(Continued)

FOREIGN PATENT DOCUMENTS

JP 07-257228 10/1995
JP 2014-213763 11/2014
(Continued)

OTHER PUBLICATIONS

International Search Report (ISR) from International Searching Authority (Japan Patent Office) in International Pat. Appl. No. PCT/JP2020/009595, dated May 26, 2020, together with an English language translation.

(Continued)

*Primary Examiner* — Pegeman Karimi
(74) *Attorney, Agent, or Firm* — Greenblum & Bernstein, P.L.C (57) ABSTRACT

A display apparatus of the present disclosure makes association between an image to be displayed in a superimposed manner and an image to be displayed in a non-superimposed manner, when displaying a first image and a second image having the same meaning, while switching between superimposed display and non-superimposed display, thereby, allowing drivers to recognize their association immediately when switching between the superimposed display and the non-superimposed occurs. As a result, AR display that is immediately understandable by drivers while not interrupting driving can be realized.

11 Claims, 7 Drawing Sheets

(58) Field of Classification Search
CPC ........ B60K 2370/179; B60K 2370/186; B60K 2370/195; B60K 2370/347; B60K 2370/52; B60K 35/00; B60K 37/00; G09G 3/00; G09G 3/001
See application file for complete search history.

(56) References Cited

U.S. PATENT DOCUMENTS

2016/0313562 A1* 10/2016 Saisho .................. B60R 1/00
2019/0196187 A1  6/2019 Kasazumi et al.
2020/0183161 A1* 6/2020 Choi .................... G06T 19/006

FOREIGN PATENT DOCUMENTS

| | | |
|---|---|---|
| JP | 2015-009677 | 1/2015 |
| JP | 2018-045103 | 3/2018 |
| JP | 2018-077400 | 5/2018 |
| WO | 2017/169610 | 10/2017 |

OTHER PUBLICATIONS

English language translation of Office Action from Japan Patent Office (JPO) in Japanese Patent Appl. No. 2021-519274, dated Nov. 28, 2023.

\* cited by examiner

DISPLAY APPARATUS FOR SWITCHING BETWEEN DIFFERENT DISPLAYS OF DIFFERENT IMAGES IDENTIFYING A SAME ELEMENT

TECHNICAL FIELD

The present disclosure relates to a display apparatus to be installed in a vehicle, for example.

BACKGROUND ART

Head-up displays (hereinafter also referred to as "HUDs") are known as display apparatuses. Such an HUD is capable of projecting an image on a translucent display medium to present the image to users so as to superimpose the image on an object visible through the display medium, thereby enabling so-called Augmented Reality (AR) display.

The HUDs to be installed in vehicles include one that presents, to drivers, for example, information assisting driving, in front of windshields as virtual images visible on actual scenery in a superimposed manner. Display apparatuses of this type are disclosed in, for example, Patent Literature (hereinafter, referred to as "PTL") 1 and PTL 2.

CITATION LIST

Patent Literatures

PTL 1: Japanese Patent Application Laid-Open No. H07-257228
PTL 2: Japanese Patent Application Laid-Open No. 2018-045103

SUMMARY OF INVENTION

Solution to Problem

Meanwhile, AR display is desirably display that is immediately understandable by drivers while not interrupting driving of the drivers as a matter of course since the AR display is made in a front field of view which is most important for driving.

Various devices have been made for such display, but it cannot be said that they are sufficient.

The present disclosure has been made in consideration of the above-mentioned points and thus provides a display apparatus capable of realizing AR display that is immediately understandable by drivers while not interrupting driving.

Means for Solving the Problems

One aspect of a display apparatus according to the present disclosure includes: an image former; and a projector capable of projecting, as a virtual image visually recognizable by a user, an image formed by the image former, in which the projector projects the image in a projection region including: a first projection region in which a first image formed by the image former is displayed in a superimposed manner as the virtual image on an actual image; and a second projection region which is located in a position different from the first projection region and in which a second image formed by the image former is displayed in a non-superimposed manner, and in which the projector is capable of displaying the first image and the second image having meanings identical to each other, while switching between projection to the first projection region as the first image and projection to the second projection region as the second image, and the first image and the second image are in visual association with each other.

Effects of the Invention

According to the present disclosure, the first image and the second image are in visual association with each other, thereby allowing drivers to recognize their association immediately when switching between superimposed display and non-superimposed display occurs. As a result, AR display that is immediately understandable by drivers while not interrupting driving can be realized.

BRIEF DESCRIPTION OF DRAWINGS

FIG. 9A illustrates displaying to the superimposed display region and FIG. 9B illustrates displaying to the non-superimposed display region.

DESCRIPTION OF EMBODIMENTS

Hereinafter, an embodiment of the present disclosure will be described with reference to the accompanying drawings.

<1> Schematic Configuration of Display Apparatus

Figure 1:
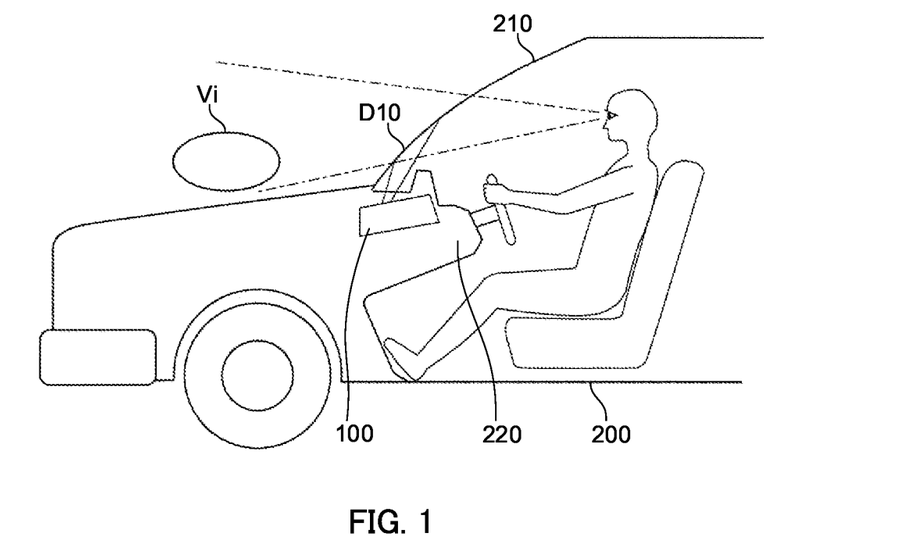
FIG. 1 is a diagram illustrating an example of installing a display apparatus according to an embodiment in a vehicle.

FIG. 1 is a diagram illustrating an example of installing display apparatus 100 according to an embodiment of the present disclosure in vehicle 200.

Display apparatus 100 in this embodiment is embodied as a head-up display (HUD) to be installed in a vehicle. Display apparatus 100 is attached in the vicinity of a top surface of dashboard 220 of vehicle 200.

Display apparatus 100 projects light onto region D10 in a field of view of a driver indicated by dashed-dotted lines in windshield (so-called windscreen) 210. Some of the projected light passes through windshield 210 while other part reflects off windshield 210. This reflected light is directed to the eyes of the driver. The driver perceives the reflected light entering the eyes as virtual image Vi that seems an image of an object on an opposite side (outside of vehicle 200) across windshield 210 with an actual object visible through windshield 210 as a background.

Figure 2:
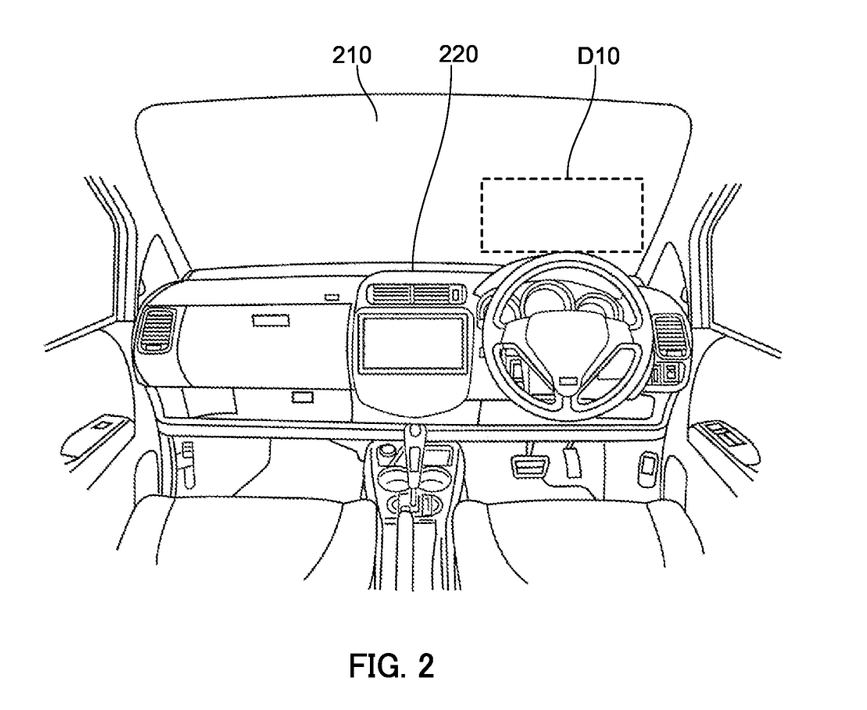
FIG. 2 is a diagram illustrating an example of a region to which light is projected by the display apparatus in the embodiment.

FIG. 2 is a diagram illustrating an example of region D10 which is a region to which light is projected by display apparatus 100 in this embodiment.

Region D10 is located in a lower position of windshield 210 on a driving seat side, for example, as illustrated to be a region surrounded by a dashed line in FIG. 2. Display apparatus 100 attached to dashboard 220 projects light onto region D10, thereby projecting an image on windshield 210 as illustrated in FIG. 1. Virtual image Vi that seems an image of an object outside of vehicle 200 from the driver is thus generated.

Figure 3:
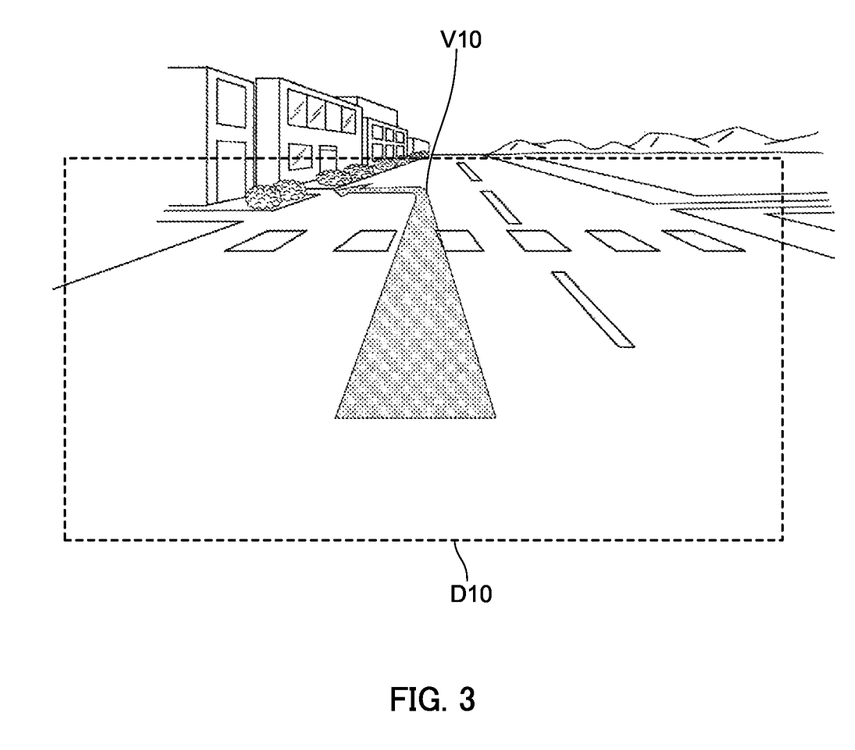
FIG. 3 is a diagram illustrating an example in which a virtual image is displayed so as to be superimposed on a foreground.

FIG. 3 is a diagram illustrating an example of a virtual image generated by display apparatus 100 according to the present embodiment and illustrating an example of superimposition between the virtual image and scenery in front of vehicle 200 as viewed from the driver of vehicle 200 during driving.

The entirety of FIG. 3 schematically illustrates some of the scenery within the field of view of the driver (not illustrated) driving vehicle 200. The dashed-line frame indicating region D10 in which the image is projected from display apparatus 100 is, however, illustrated for convenience of description of the present embodiment and is neither present nor perceived by the driver. The arrow image denoted by reference sign V10 is an Augmented Reality (AR) route which is an example of virtual image Vi generated by display apparatus 100 and perceived by the driver.

As illustrated in FIG. 3, virtual image V10 is displayed so as to be superimposed on the scenery actually seen in the field of view of the driver. In practice, virtual image V10 is displayed while being superimposed on the road. As a result, the driver is guided to travel on the belt-shaped region illustrated by virtual image V10.

Figure 4:
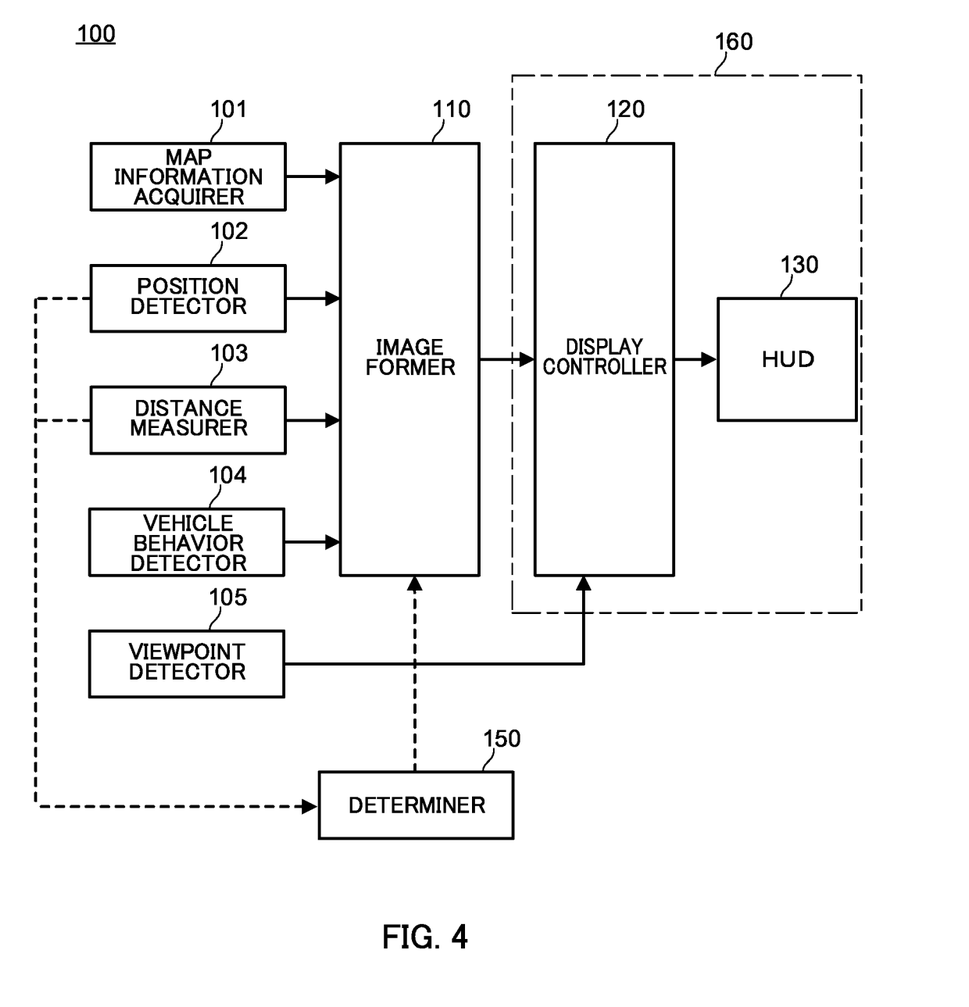
FIG. 4 is a block diagram illustrating a configuration example of the display apparatus.

FIG. 4 is a block diagram illustrating a configuration example of display apparatus 100.

Display apparatus 100 includes map information acquirer 101, position detector 102, distance measurer 103, vehicle behavior detector 104, viewpoint detector 105, image former 110, display controller 120, HUD 130, and determiner 150.

Map information acquirer 101 acquires map information including information representing topography, a road shape, and/or the like with coordinates of an absolute coordinate system. The map information acquired by map information acquirer 101 may be one that is stored in a map information storage medium mounted in vehicle 200 or one that is acquired by communication with an external apparatus. In the case of the present embodiment, map information acquirer 101 is a so-called navigation system and acquires a route from a current location to a destination. Map information acquirer 101 outputs the map information and the route information to image former 110.

Position detector 102 is embodied by a GPS receiver, a gyroscope, a vehicle speed sensor, and/or the like and detects the current location of vehicle 200 in which this position detector 102 is installed.

Distance measurer 103 is a radar and/or a camera, and/or an infrared sensor, for example, and detects the presence or absence of an object and/or the distance to the object.

Vehicle behavior detector 104 is embodied by a gyroscope, a suspension stroke sensor, a vehicle speed sensor, an acceleration sensor, and/or the like and detects a physical quantity indicating the behavior of the vehicle.

Viewpoint detector 105 captures an image of the eyes of the driver, for example, by an infrared camera and measures the coordinates of the positions of the eyes of the driver in a vehicle coordinate system by image processing from the captured image of the eyes. The result of detection by viewpoint detector 105 is output to display controller 120.

Image former 110 forms an image serving as a basis for virtual image Vi based on the input signals from map information acquirer 101, position detector 102, distance measurer 103, and vehicle behavior detector 104.

Display controller 120 displays virtual image Vi in region D10 of the windshield by controlling a light source, a scanner, a screen driver, and/or the like forming HUD 130, based on the image formed by image former 110 and the viewpoint information.

Display controller 120 and HUD 130 function as projector 160 capable of projecting an image formed by image former 110 as a virtual image superimposed on an actual image visible from a user (the driver in the present embodiment). Display controller 120 and HUD 130 also function as projector 160 capable of projecting an image formed by image former 110 as a non-superimposed virtual image not superimposed on the actual image visible from the user.

In addition to the above, in the case of the present embodiment, position detector 102 and distance measurer 103, as illustrated by dotted lines in FIG. 4, and outputs the reliability information on sensing to determiner 150. Determiner 150 performs determination processing as described hereinafter, based on the reliability information, and outputs a result of determination to image former 110. Image former 110 switches between the superimposed display and the non-superimposed display based on the result of determination.

Figure 5:
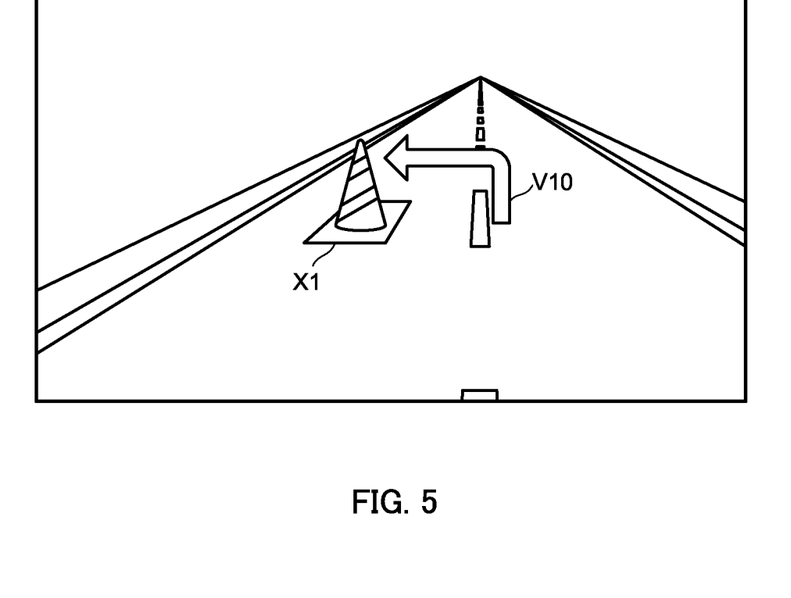
FIG. 5 is a diagram illustrating an example in which a correct virtual image is displayed.
Figure 6:
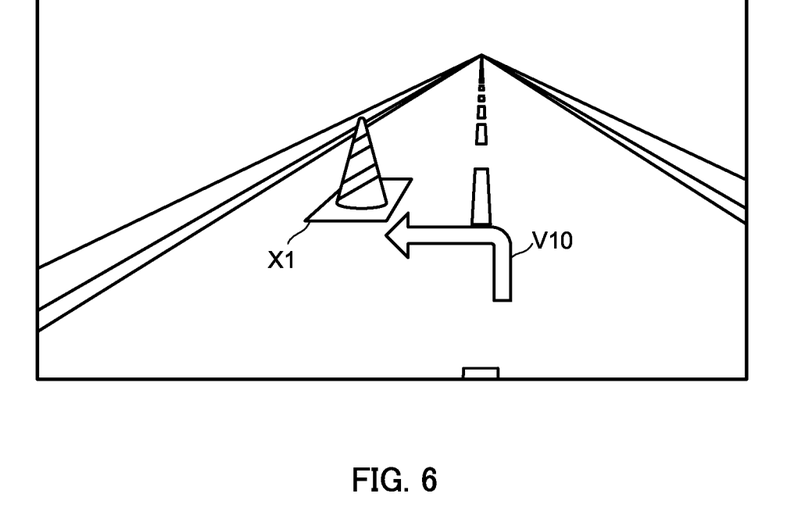
FIG. 6 is a diagram illustrating an example in which an incorrect virtual image is displayed.

<2> Displaying Association Between Superimposed Region and Non-Superimposed Region FIGS. 5 and 6 each illustrate an example of a front field of view visible from the driver. FIG. 5 illustrates an example in which correct virtual image V10 is displayed, and FIG. 6 illustrates an example in which incorrect virtual image V10 is displayed. In the example of correct display in FIG. 5, virtual image V10 instructing driving behind obstacle X1 is displayed forward in the traveling direction. Meanwhile, in the example of incorrect display in FIG. 6, virtual image V10 is displayed in front of obstacle X1. One reason for such incorrect display is a poor accuracy of the sensing signal output from position detector 102 and/or distance measurer 103 to image former 110.

For this reason, display apparatus 100 of this embodiment is configured to input the reliability information on the sensing outputted from position detector 102 and distance measurer 103 to determiner 150 and to switch the display image to be displayed on HUD 130 based on the reliability information.

In other words, whether to perform superimposed display or non-superimposed display is selected in accordance with the reliability of the sensor (position detector 102 and/or distance measurer 103) that obtains the position information for determining the projection position of the virtual image projected by projector 160. Accordingly, it is possible to prevent incorrect (poor accuracy) virtual image V10 as illustrated in FIG. 6 from being displayed.

Figure 7:
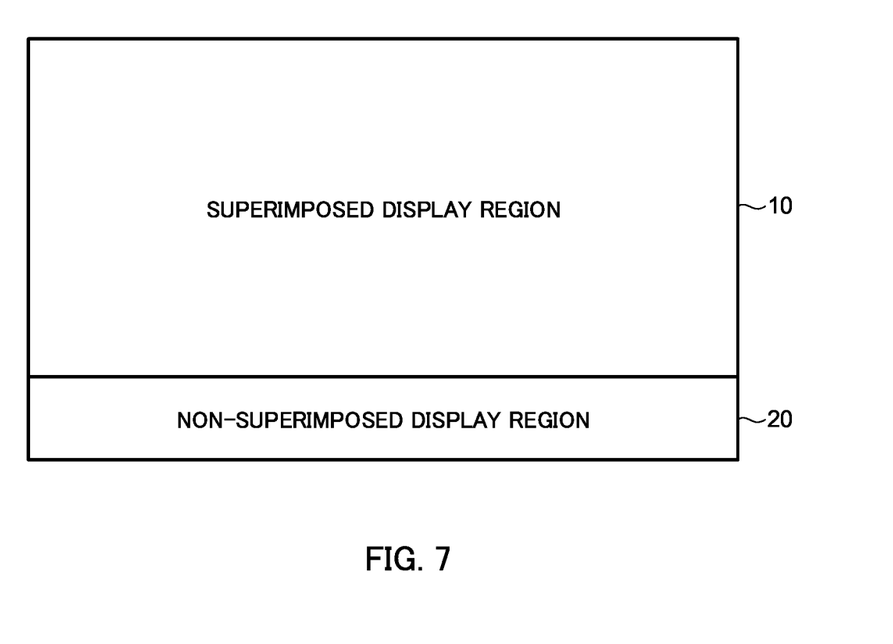
FIG. 7 is a diagram illustrating a display region of an HUD.

FIG. 7 illustrates a display region of HUD 130. The display region of the HUD is divided into a superimposed display region (first projection region) 10 in which a first image formed by image former 110 is displayed in a superimposed manner as a virtual image on an actual image, and a non-superimposed display region (second projection region) 20 which is located in a position different from the first projection region and in which a second image formed by image former 110 is displayed in a non-superimposed manner.

In the case of this embodiment, superimposed display region (first projection region) 10 is located in front of the driver. In other words, superimposed display region (first projection region) 10 is located in the primary field of view of the driver. Stated differently, non-superimposed display region (second projection region) 20 is located in a lower position adjacent to superimposed display region (first projection region) 10. Note that, superimposed display region (first projection region) 10 and non-superimposed display region (second projection region) 20 are not necessarily adjacent to each other. Non-superimposed display region 20 may be referred to as a static (ST) display region.

In non-superimposed display region 20, the second image having the same meaning as the first image not displayed in superimposed display region 10 is displayed. Further, a numerical image presenting the behavior of the vehicle, such as a vehicle speed, is displayed in non-superimposed display region 20.

Figure 8:
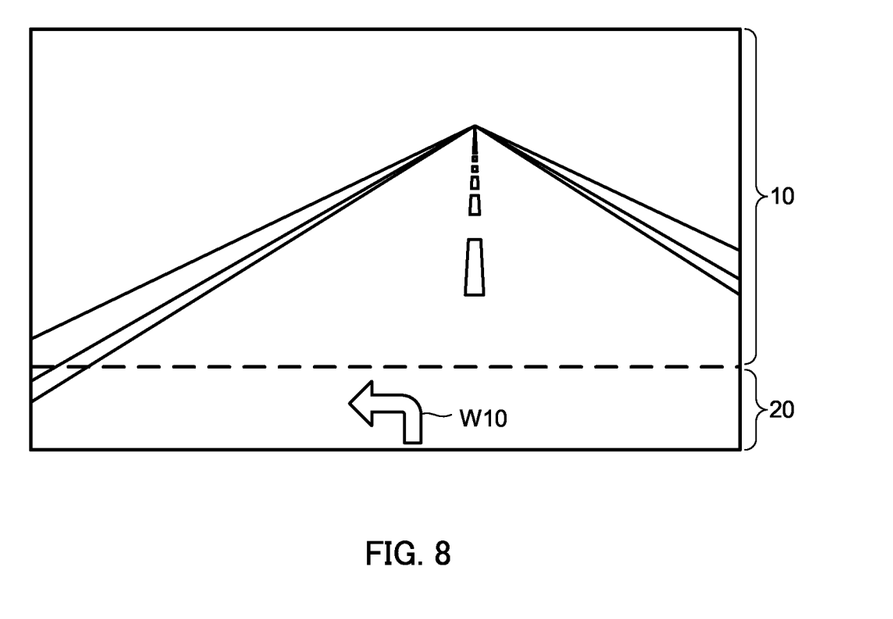
FIG. 8 is a diagram illustrating a display example in a non-superimposed display region.

FIG. 8 is a diagram illustrating a display example in non-superimposed display region 20. Virtual image V10 displayed in superimposed display region 10 in FIGS. 5 and 6 is switched to the non-superimposed display region and displayed as image W10 in FIG. 8. The trigger that causes switching from the superimposed display to the non-superimposed display may be, for example, a decrease in the reliability of sensing as described above, or may be an operation by the driver.

Figure 9A:
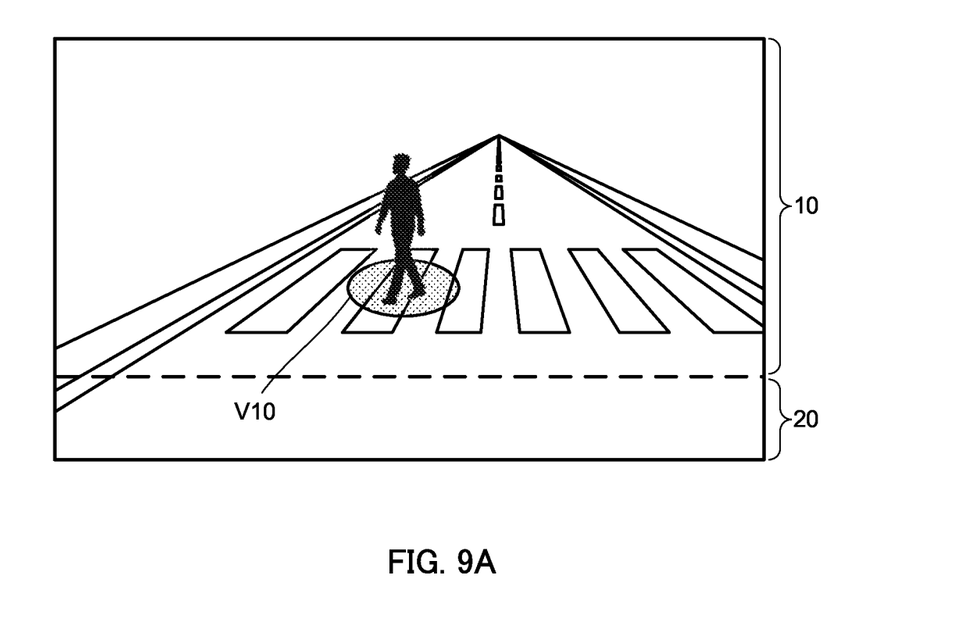
FIGS. 9A and 9B are diagrams illustrating examples of displaying an image having the same meaning to a superimposed display region and a non-superimposed display region.
Figure 9B:
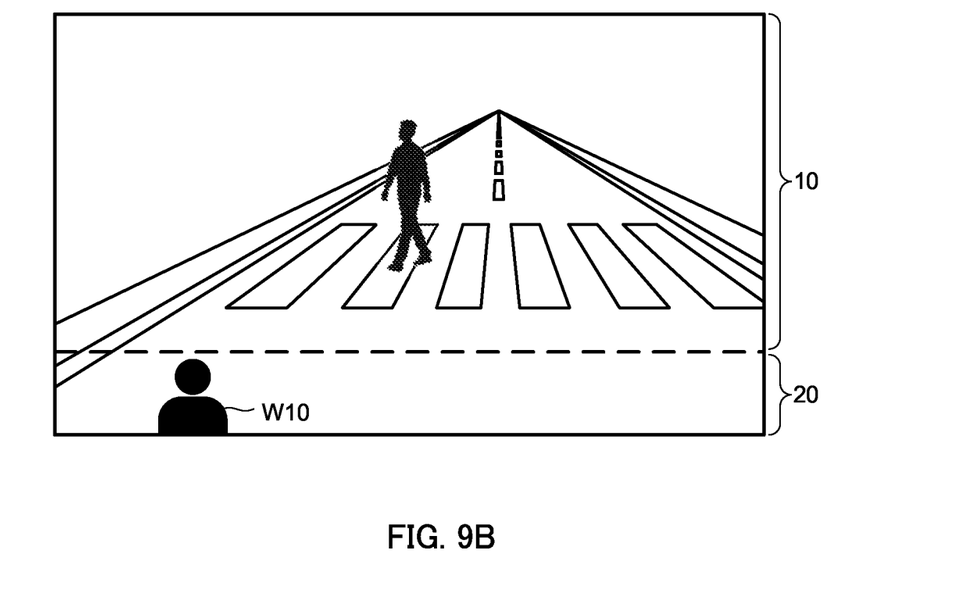

FIG. 9 illustrates an example of displaying an image having the same meaning in superimposed display region 10 and displaying the image in non-superimposed display region 20. In the example of displaying in superimposed display region 10 in FIG. 9A, virtual image V10 of an elliptical shape for calling attention to the driver is displayed in a feet area of the pedestrian. In the example of displaying to non-superimposed display region 20 in FIG. 9B, image W10 of a human shape indicating a pedestrian is displayed. Accordingly, as described above, switching between the displaying illustrated in FIG. 9A and the displaying illustrated in FIG. 9B is performed, for example, in accordance with the reliability of sensing and/or by the operation of a driver each serving as a trigger.

As described above, in the present embodiment, an image having the same meaning is displayed in superimposed display region 10 when the reliability of sensing is high, for example, and is displayed in non-superimposed display region 20 when the reliability of sensing is low. Thus, it is possible to prevent displaying of a virtual image with poor positional accuracy for the actual image in superimposed display region 10 when the reliability of sensing is low. Further, when the driver views image W10 displayed in non-superimposed display region 20, the driver can be informed of the information meant by image W10 actually although it is not displayed, and further can recognize that sensing processing is active.

Note that, the switching control between superimposed display and the non-superimposed display as described above can be performed by an operation of the driver via a manipulator (not illustrated). When the driver does not wish to see superimposed display, the content can be displayed in a non-superimposed manner as an icon image without being displayed in a superimposed manner.

The inventor(s) of the present invention considers/consider that, when the first image and the second image having the same meaning are switched and displayed in superimposed display region 10 and non-superimposed display region 20 as described above, association between the image displayed in superimposed display region 10 and the image displayed in the non-superimposed display region allows drivers to immediately understand the meaning of content and thus is very convenient for the drivers.

Taking the above consideration into account, in the present embodiment, association processing is performed between the first image displayed in superimposed display region 10 and the second image displayed in non-superimposed display region 20 when the first image and the second image having the same meaning are switched and displayed in superimposed display region 10 and non-superimposed display region 20. Actually, processing to form the first image and the second image in association with each other is performed by image former 110.

In the present embodiment, the following methods are each presented as a method for making association between the first image and the second image. Note that, any one of the following methods may be used or a combination of a plurality of methods may be used for the association.

(Association Method 1)

The first image and the second image having the same meaning are associated with each other by color. The first image and the second image have, for example, the same color. Virtual image V10 of an elliptical shape in FIG. 9A is in yellow, and image W10 in FIG. 9B is in yellow as well, for example.

(Association Method 2)

The first image and the second image having the same meaning are associated with each other by shape. The first image and the second image have, for example, the same or similar shapes, for example. FIGS. 5 and 8 are examples corresponding to this case, and virtual image V10 (FIG. 5) and image W10 (FIG. 8) have similar shapes, for example.

(Association Method 3)

The first image and the second image having the same meaning are associated with each other by position. When virtual image V10 in FIG. 9A is displayed in a left edge position of the screen, for example, image W10 of FIG. 9B is also displayed in a left edge position of the screen, for example.

(Association Method 4)

The first image and the second image having the same meaning are temporarily displayed first in both of superimposed display region 10 and non-superimposed display region 20, and then the displaying is switched to either one of the regions.

<3> Switching Control Between Superimposed Display and Non-Superimposed Display

Display apparatus 100 of this embodiment as described above switches, in accordance with the reliability of sensing by the sensor (position detector 102 and/or distance measurer 103), between displaying the first image and the second image having the same meaning (pedestrian in the example of FIG. 9) as the first image (elliptical shape in the example of FIG. 9A) in the first projection region (superimposed display region 10) in a superimposed manner and displaying the first and the second images as the second image (human shape icon in the example of FIG. 9B) in the second projection region (non-superimposed display region 20) in a non-superimposed manner.

Figure 10:
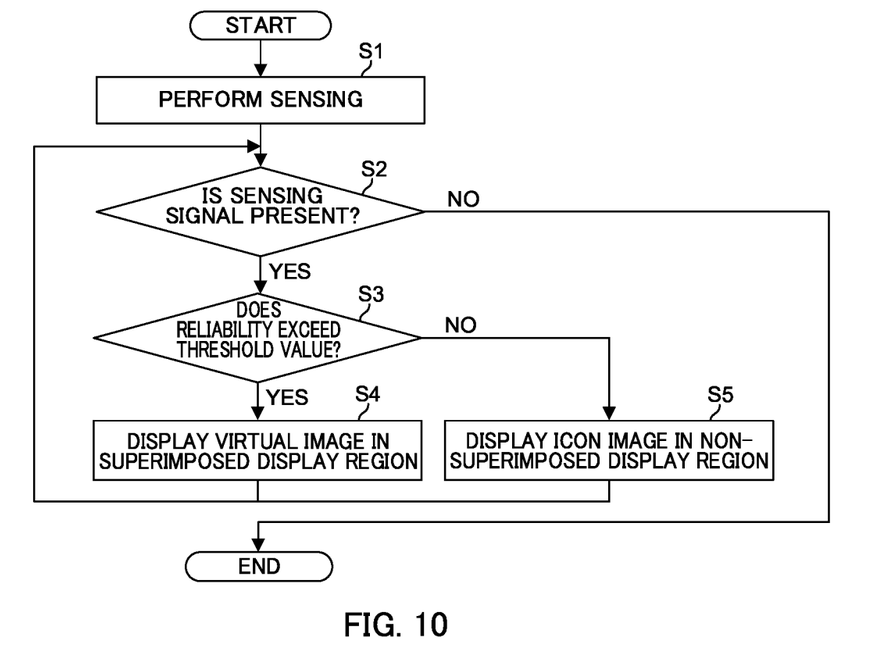
FIG. 10 is a flowchart provided for describing a switching operation between the superimposed display and the non-superimposed display.

FIG. 10 is a flowchart provided for describing the switching operation between the superimposed display and non-superimposed display.

In step S1, sensing is performed by position detector 102 and distance measurer 103, for example. When a sensing signal is present, display apparatus 100 performs processing to display an image corresponding to a result of sensing.

More specifically, when a sensing signal is present, the processing proceeds from step S2 to step S3. In step S3, determiner 150 determines whether the reliability of the sensing signal exceeds a predetermined threshold value. When the reliability exceeds the threshold value, the processing proceeds to step S4, and virtual image V10 is displayed in superimposed display region 10. Meanwhile, when the reliability is not greater than the threshold value, the processing proceeds to step S5, and image W10 is displayed in the non-superimposed display region. More specifically, referring to FIGS. 9A and 9B for further description, when the reliability exceeds the threshold value, an image having an elliptical shape as illustrated in FIG. 9A is formed by image former 110 and is displayed as virtual image V10 in superimposed display region 10. Meanwhile, when the reliability is not greater than the threshold value, an image of a human shape as illustrated in FIG. 9B is formed by image former 110 and is displayed as image W10 in non-superimposed display region 20.

After step S4 or step S5, the processing returns to step S2. When it is determined that a sensing signal is not present in step S2, the display processing of this content (e.g., pedestrian) ends.

In the manner described above, when the reliability of the sensing is low, it is possible to prevent incorrect (i.e., poor positional accuracy) superimposed display as illustrated in FIG. 6 from being performed and thus to prevent wrong information from being transmitted to the driver.

Meanwhile, when the switching between the superimposed display and the non-superimposed display is performed based on the reliability of sensing as described above, frequent changes in the reliability of sensing in a short time causes frequent switching between the superimposed display and the non-superimposed display, which possibly results in troublesome displaying for drivers. In a case where a bright place and a dark place appear in a frequently switched manner while vehicle 200 travels on a tree-lined road, for example, the reliability of the sensor changes frequently; thus, switching between the superimposed display and non-superimposed display is likely to occur frequently.

In this respect, the following method is presented as an improvement plan for the switching control in this embodiment.

Figure 11:
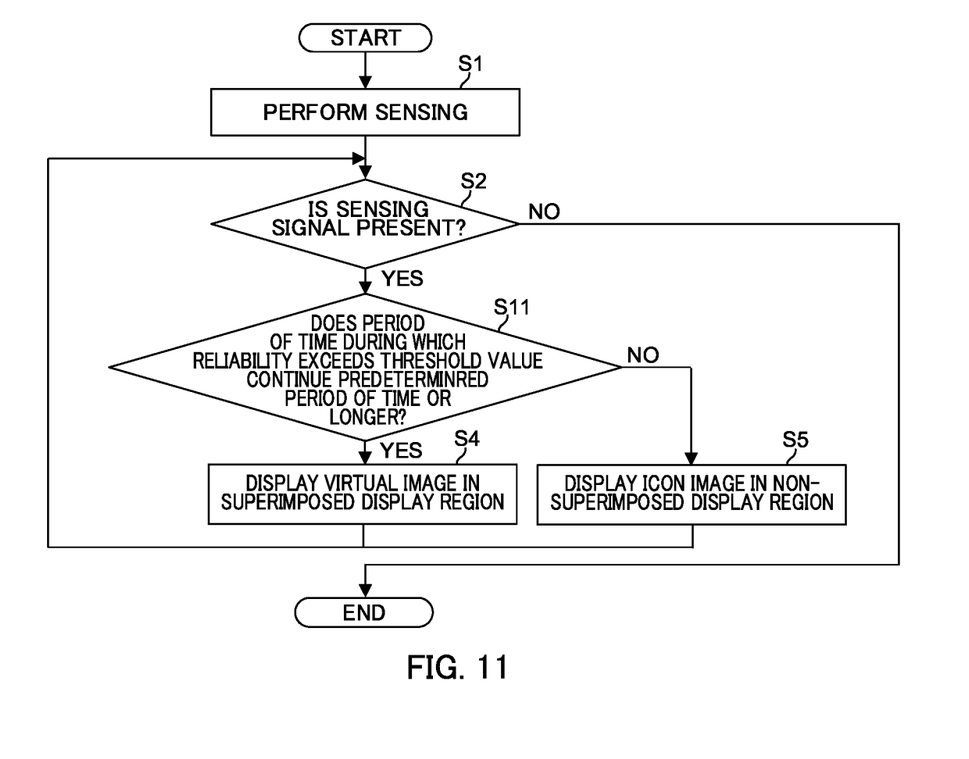
FIG. 11 is a flowchart provided for describing another switching operation between the superimposed display and the non-superimposed display.

When the period of time during which the reliability of sensing exceeds a predetermined threshold continues for a predetermined period of time (e.g., 0.5 seconds) or longer, superimposed display is performed, and otherwise, non-superimposed display is performed. FIG. 11 illustrated with the same reference numerals assigned to the corresponding portions of FIG. 10 is a flowchart corresponding to this switching control method. FIG. 11 is different from FIG. 10 in determination criterion of step S11. When the reliability of sensing frequently changes in a short time, the processing proceeds from step S11 to step S5. As a result, even when the reliability of the sensing changes frequently in a short time, switching between the superimposed display and the non-superimposed display is not frequently performed, thus, suppressing troublesome display.

Note that, it can be said that this switching control method is an example in which the condition of reliability for switching from superimposed display to non-superimposed display and the condition of reliability for switching from non-superimposed display to superimposed display are made different. Making the conditions for the switching different from each other as described above enables prevention of adverse effects due to frequent switching.

Note that, wrong superimposed display is very dangerous; thus, the condition of the reliability for switching from non-superimposed display to superimposed display is preferably set more strictly than the condition of the reliability for switching from superimposed display to non-superimposed display.

In addition, the second image once displayed in a non-superimposed manner is preferably not to be switched to superimposed display until the information meant by this second image becomes invalid. When the second image is an image for guiding a left turn as illustrated in FIG. 8, for example, switching to superimposed display is not performed until the vehicle completes making the turn at the intersection. Further, when the second image is a warning image for a pedestrian as illustrated in FIG. 9B, for example, switching to superimposed display is not performed until the pedestrian become no longer the warning target. In this manner, it is made possible to prevent suddenly displaying a content in a superimposed manner and thus to prevent drivers from being surprised.

<4> Summary

As described above, according to the present embodiment, when the first image and the second image having the same meaning are displayed in such a manner that switches between superimposed display and non-superimposed display, making association between an image to be displayed in a superimposed manner and an image to be displayed in a non-superimposed manner allows drivers to recognize their association immediately when superimposed display and non-superimposed display are switched. As a result, AR display that is immediately understandable by drivers while not interrupting driving can be realized.

The embodiments described above are merely illustrative in implementing the present invention, and the technical scope of the present invention should not be construed as limiting by these embodiments. In other words, the present invention may be implemented in various forms without departing from the gist thereof or from the main features thereof.

In the embodiment described above, a description has been given of the case where the display apparatus of the present disclosure is applied to an HUD to be installed in a vehicle, but the present invention is not limited to this, and the present invention can be broadly applied to display apparatuses each displaying a first image and a second image having the same meaning in such a manner that switches between superimposed display and non-superimposed display.

Each processing of the above-described embodiment can be realized by software, hardware, or software in cooperation with hardware. Each functional block used in the description of the embodiment described above can be partly or entirely realized by an LSI, such as an integrated circuit, and each process described in the embodiment may be controlled partly or entirely by the same LSI or a combination of LSIs. The LSI may be formed of individual chips, or may be formed of one chip so as to include a part or all of the functional blocks. The LSI may include an input and an output for data. The LSI herein may be referred to as an IC, a system LSI, a super LSI, or an ultra LSI depending on a difference in the degree of integration. The technique of implementing an integrated circuit is not limited to the LSI, however, and may be realized by using a dedicated circuit, a general-purpose processor, or a dedicated processor. In addition, an FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of advancement of semiconductor technology or other derivative technology, the functional blocks could be integrated using the future integrated circuit technology. Biotechnology can also be applied.

The disclosure of the specification, drawings and abstract contained in Japanese Patent Application No. 2019-091361, filed on May 14, 2019, is incorporated herein by reference in its entirety.

INDUSTRIAL APPLICABILITY

The display apparatus of the present invention is suitable for HUDs to be installed in vehicles, for example.

REFERENCE SIGNS LIST

10 Superimposed display region
20 Non-superimposed display region
100 Display apparatus
101 Map information acquirer
102 Position detector
103 Distance measurer
104 Vehicle behavior detector
105 Viewpoint detector
110 Image former
120 Display controller
130 Head-up display (HUD)
150 Determiner
160 Projector
200 Vehicle
210 Windshield
220 Dashboard
L10 Curved line
Vi, V10 Virtual image
W10 Icon image

The invention claimed is:

1. A display apparatus, comprising:
an image former; and
a projector capable of projecting images formed by the image former in a projection region of a display, wherein
the projector is capable of projecting a first image formed by the image former and a second image formed by the image former in the projection region of the display, the first image and the second image each identifying a same element,
the projection region of the display includes: a first projection region in which the first image formed by the image former is displayed in a superimposed manner as a virtual image on an actual image; and a second projection region which is located in a position different from the first projection region and in which the second image formed by the image former is displayed in a non-superimposed manner,
the projector projects the first image to the first projection region in response to a predetermined condition being satisfied and projects the second image to the second projection region in response to the predetermined condition not being satisfied,
the projector switches whether to project the first image to the first projection region and to project the second image to the second projection region based on the predetermined condition, and
the first image and the second image are in visual association with each other.

2. The display apparatus according to claim 1, wherein the first image and the second image are in visual association with each other by at least one of color, shape, or position.

3. The display apparatus according to claim 1, wherein the first image and the second image are associated with each other so as to be linked with each other visually dynamically.

4. The display apparatus according to claim 1, wherein, in a first case, projection of the first image to the first projection region is performed after projection of the second image to the second projection region and, in a second case, the projection of the second image to the second projection region is performed after the projection of the first image to the first projection region, with the projections being performed temporarily simultaneously.

5. The display apparatus according to claim 1, further comprising:
a sensor that detects position information for determining a projection position of the virtual image to be projected by the projector, wherein
switching between projecting the first image to the first projection region and projecting the second image to the second projection region is performed in accordance with reliability of sensing by the sensor.

6. The display apparatus according to claim 5, wherein the first image is projected to the first projection region in a first case where the reliability exceeds a predetermined threshold value, and the second image is projected to the second projection region in a second case where the reliability is equal to or less than the predetermined threshold value.

7. The display apparatus according to claim 5, wherein the first image is projected to the first projection region in a first case where a period of time during which the reliability exceeds a predetermined threshold value continues for a predetermined period of time or longer, and the second image is projected to the second projection region in a second case other than the first case.

8. The display apparatus according to claim 5, wherein a first condition of the reliability for switching from displaying in the superimposed manner to displaying in the non-superimposed manner is different from a second condition of the reliability for switching from displaying in the non-superimposed manner to displaying in the superimposed manner.

9. The display apparatus according to claim 8, wherein the second condition of the reliability for switching from displaying in the non-superimposed manner to displaying in the superimposed manner is stricter than the first condition of the reliability for switching from displaying in the superimposed manner to displaying in the non-superimposed manner.

10. The display apparatus according to claim 1, wherein the second image displayed in the non-superimposed manner is not switched to be displayed in the superimposed manner until information meant by the second image becomes invalid.

11. A display apparatus, comprising:
a display; and
a processor, the processor being configured to cause images to be projected in a projection region of the display, wherein the processor is configured to project a first image and a second image in the projection region of the display, the first image and the second image each identifying a same element, the projection region of the display includes: a first projection region in which the first image is displayed in a superimposed manner as a virtual image on an actual image; and a second projection region which is located in a position different from the first projection region and in which the second image is displayed in a non-superimposed manner, the projector projects the first image to the first projection region in response to a predetermined condition being satisfied and projects the second image to the second projection region in response to the predetermined condition not being satisfied, the projector switches whether to project the first image to the first projection region and to project the second image to the second projection region based on the predetermined condition, and the first image and the second image are in visual association with each other.

* * * * *